United States Patent [19]

Chen

[11] Patent Number: 4,693,576

[45] Date of Patent: Sep. 15, 1987

[54] CAMERA FOR PRODUCING FULLY MOUNTED TRANSPARENCIES

[75] Inventor: Richard J. Chen, Winchester, Mass.

[73] Assignee: Polaroid Corporation, Cambridge, Mass.

[21] Appl. No.: 947,358

[22] Filed: Dec. 29, 1986

[51] Int. Cl.⁴ ............................................. G03B 17/50
[52] U.S. Cl. ......................................... 354/86; 354/304
[58] Field of Search ................... 354/83, 84, 85, 86, 354/87, 304

[56] References Cited

U.S. PATENT DOCUMENTS

| | | | |
|---|---|---|---|
| 3,183,809 | 5/1965 | Nerwin | 354/87 |
| 3,525,293 | 8/1970 | Harvey | 354/86 |
| 3,722,383 | 3/1973 | Van Allen et al. | 354/84 |
| 4,114,166 | 9/1978 | Driscoll et al. | 354/86 |
| 4,566,772 | 1/1986 | Sulesky et al. | 354/303 |
| 4,600,680 | 7/1986 | Fichter | 430/207 |
| 4,607,926 | 8/1986 | Fichter | 354/86 |
| 4,607,927 | 8/1986 | Morse | 354/182 |

Primary Examiner—A. A. Mathews
Attorney, Agent, or Firm—Alfred E. Corrigan

[57] ABSTRACT

A camera for use with a film assembly having a carrier strip on which are detachably mounted film chips for recording an image, slide mounts which contain rupturable pods holding developing chemicals, a take-up spool upon which the carrier strip is wound for retaining exposed film chips which are not immediately mounted and developed, and manually selectable directing rollers for selectively directing an exposed film chip from the carrier strip and to the slide mounts, or to the exposed film retention spool.

16 Claims, 10 Drawing Figures

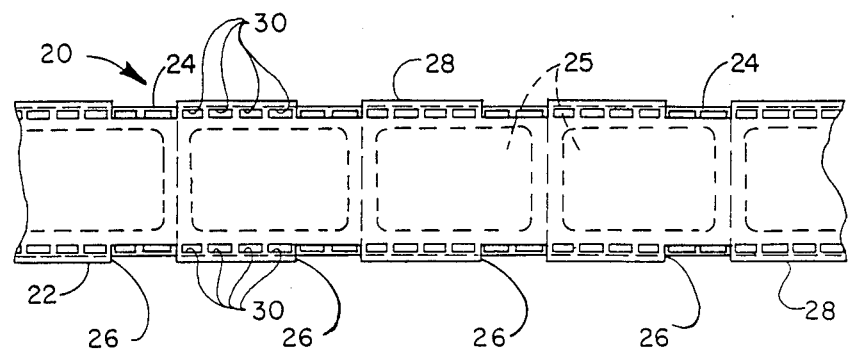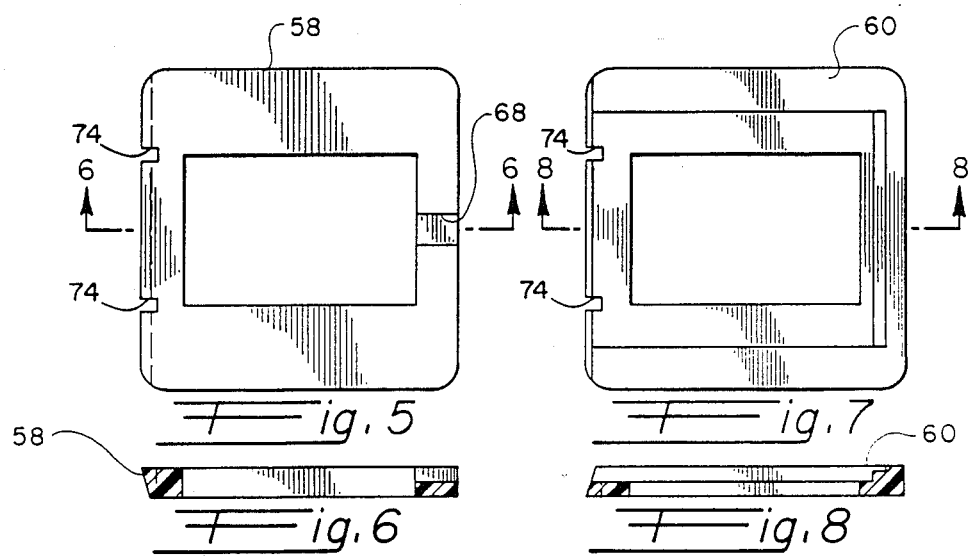

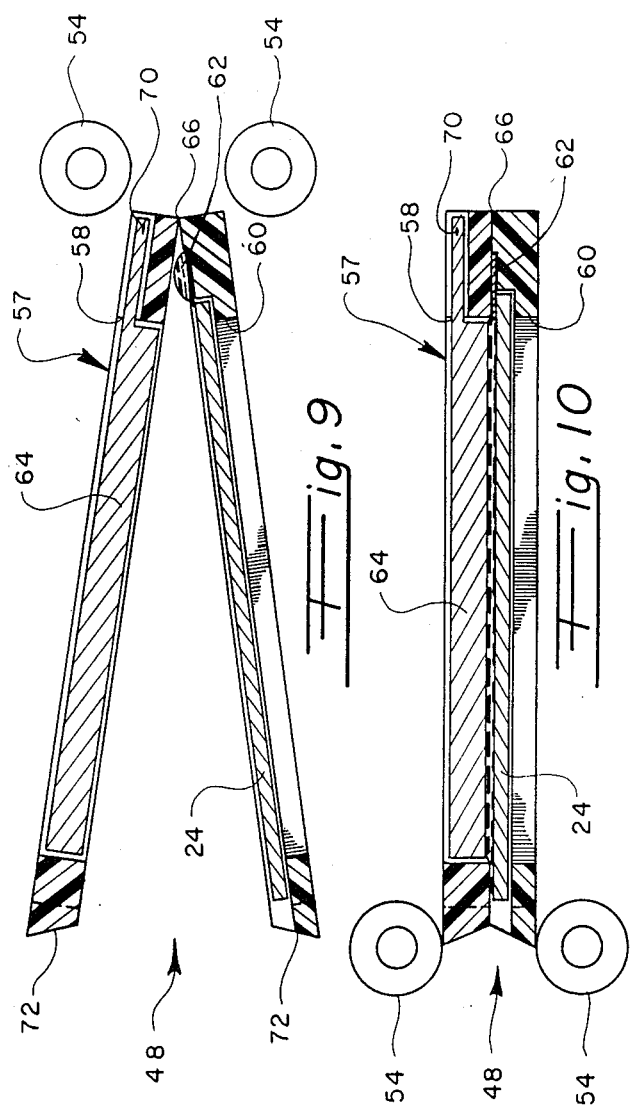

CAMERA FOR PRODUCING FULLY MOUNTED TRANSPARENCIES

FIELD OF THE INVENTION

The present invention relates to the field of photographic apparatus, and most especially to cameras in which an exposed film is developed inside the camera.

BACKGROUND OF THE INVENTION

In the art of photography, there are cameras in which an exposed film is developed inside the camera, and there are cameras in which an exposed film is retained for subsequent development outside the camera. Each type of camera has its own advantages and disadvantages.

An advantage of the camera in which exposed film is developed inside the camera is that the operator can see the results of his picture taking almost immediately and does not have to wait a long period of time for development outside the camera. One disadvantage in using this type camera is that the operator of the camera has no choice as to when the film is developed or where the film is developed. The film must be developed immediately after the picture is taken and must be developed in the camera. The development of the film cannot be postponed to a later time at another location. There may be times, however, that the photographer is in a hurry to take a series of pictures and does not want to interrupt his picture taking by having to wait for an exposed frame to be developed in the camera. In addition, it may be inconvenient for the photographer to handle the developed prints or transparencies in the location where the pictures are being taken. The photographer may be on the move or in a location where stopping and handling the finished photographs is not practical.

An advantage of the camera in which the film is not developed is that it permits the rapid taking of a series of pictures without the photographer needing to worry about the time required to develop film in the camera and the handling of the developed photographs during a photographic session. A disadvantage of the non-developing camera is that the photographer cannot know the form and content of his photographs until he leaves the scene of the picture taking. This is undesirable because very often the scene that he is photographing would be difficult or impossible to duplicate at a later time if it turns out that the exposures that were made were not satisfactory.

When transparent slides are to be produced from exposed film, the conventional procedure is to have a roll of exposed film processed, and then have the developed transparencies cut off the roll and mounted in slide mountings to form transparent slides. This is a time consuming and inconvenient procedure, and it would be desirable to provide a camera in which exposures on a film could be mounted as slides within the camera. Furthermore, it would be desirable to provide a camera in which exposures were mounted in slides without the need for cutting any film strip.

SUMMARY OF THE INVENTION

Accordingly, it is an object of the present invention to alleviate the disadvantages and deficiencies of the prior art by providing a camera which permits the photographer to select either development of exposures in the camera or retention of the exposures in the camera for development at another location.

Another object of the invention is to provide a camera in which exposures are mounted as slides within the camera.

Another object of the invention is to provide a camera in which exposures are mounted in slide mountings in the camera without the need for cutting any film strip.

Yet another object of the present invention is to provide a camera which permits the photographer to select development of exposures in the camera or retention of exposures in the camera for development at another location and also to provide a camera in which exposures are mounted as slides within the camera and developed in the slide mountings.

In accordance with the broad teachings of the present invention, a photographic apparatus is provided in which the photographer has the option of either causing exposed film to be developed in the photographic apparatus or retained in the photographic apparatus for development outside the apparatus.

The film to be developed is preferably a separable film chip adhesively, or otherwise, retained on a continuous transparent carrier strip which is initially stored on a storage spool and moved to an exposure station and to a take-up spool in the camera before being rewound on its storage spool. If the film chip is to be developed in the camera, the exposed chip is separated from the transparent carrier strip and directed to a developing station in the camera. If the film chip is to be developed outside the camera, the exposed film chip is not separated from the carrier strip and is directed to the take-up spool along with the carrier strip.

In accordance with another aspect of the invention, a photographic apparatus is provided in which the photographer has the option of either causing exposed film to be mounted as a slide within the photographic apparatus or having the exposed film retained in the photographic apparatus in a retention area. The film to be developed can be a separable film chip retained on a continuous carrier strip. At a manually actuated directing station, the film chip can be separated from the carrier strip and directed to another station where the chip is placed in a mounting to form a slide. If the directing station is not actuated, the carrier strip retains the film chip, and the chip and carrier are wound together on a take-up spool.

In accordance with yet another broad aspect of the invention, a photographic apparatus is provided in which the photographer has the option of either causing exposed film to be directed to a slide mounting where it is developed by processing materials or to direct the exposed film to a retention area thereby avoiding both development and slide mounting within the photographic apparatus.

Preferably, the film chip is a multiple layer article which includes in sequence (a) a transparent base through which the image enters the film chip, (b) an additive color screen, (c) a positive layer also known as an image receiving layer, (d) a stripping layer which facilitates separation of the positive from the negative, (e) and a photosensitive negative layer also known as the emulsion layer. The well known operation of the film chip operates briefly as follows. The light from the image comes through the transparent base layer and the additive color screen to the positive layer, through the positive layer, through the stripping layer, and hits the negative layer thereby exposing the negative.

To develop the exposed image in the film chip, processing materials, generally liquids, are applied to the negative layer from a rupturable pod. During processing, the unexposed silver halide migrates from the negative layer, through the stripping layer, and to the the positive layer. After processing, a positive image resides in the positive layer, and a negative image resides in the negative layer.

To facilitate even spreading of the processing liquids on the negative layer, and to protect the processing rollers from contamination with the caustic processing liquids, an opaque strip sheet is located above the negative with a space therebetween, and the processing liquids are spread in the space between the strip sheet and the negative layer. With the invention, the strip sheet is carried by a slide mounting.

After development of both the negative and positive images in the film chip has been completed, it is desirable to separate the negative layer from the positive layer. To do this, another property of the processing liquids is utilized. Not only do the processing liquids serve to develop the negative and positive images, they also serve to cause the top strip sheet to adhere or bond to the negative layer. When the strip sheet is grasped by the photographer and stripped off, the negative layer is also removed from the film chip. Furthermore, the stripping layer in the film chip adheres tenaciously to the negative layer. Therefore, when the negative layer is stripped off of the film chip by the removal of the stripping sheet, the stripping layer is also stripped off of the film chip leaving only the positive transparent layer remaining in the film chip. In this way, a positive color transparency is provided which is mounted as a slide mounting.

In accordance with the teachings of the present invention, a preferred embodiment is herein disclosed where a camera includes a two-state selectively operated chip lifting roller. In the first state, the chip lifting roller exerts pressure on the back of the film chip thereby causing the edge of the exposed film chip to begin to separate from the continuous carrier strip. The film chip that begins to separate from the carrier strip passes over a wedge which completes the separation of the film chip from the carrier strip. After being completely separated from the carrier strip, the separated film chip is directed to a mounting and is retained thereby. The mounting contains a rupturable pod of processing materials. The pod is ruptured by processing rollers, and the processing materials are spread over the exposed film chip mounted in the mounting to begin film development in the camera. The developing film chip in its mounting is directed to an imbibition chamber in which development is completed. After development is completed, the mounted print or slide is removed from the camera.

In the second state, the chip lifting roller is not in contact with the carrier strip and does not cause the exposed film chip to separate from the carrier. When the exposed film chip is not separated from the carrier strip, it is directed to a take-up spool for retention of the exposed film chips for development outside the camera.

To facilitate exertion of a separation force on the exposed film chip at the proper location and proper time in its sequential progression inside the camera, the carrier strip may be provided with redirection cutouts that permit proper positioning of a film chip with respect to the manually selectable directing station. Generally, a film chip will overlap and be in registration with a cutout. When the cutout and overlapping film chip reach the directing station, the directing rollers extend through the cutout and press against the film chip thereby causing it to begin to separate from the carrier strip. The carrier strip continues to move along to a take-up spool, and the separation of the film chip from the carrier is completed by a wedge or the like.

By employing the principles of the invention, numerous objects are realized and numerous benefits are obtained. For example, a camera is provided which gives the photographer the option of having a film chip mounted as a slide or retained on a film roll. A camera made in accordance with the teachings of the invention also gives the photographer the option of having the film chip developed inside the camera or having the film developed outside the camera. A camera in accordance with the invention also gives the photographer the opportunity to both have a film chip mounted as a slide and have the chip developed inside the camera.

A photographer can use a camera of the invention and have increased versatility as to how he (or she) conducts a photographic session. For example, the photographer can take one exposure and have it developed and mounted in a slide mounting in the camera. After checking the developed transparency, he may then conclude that the light and camera settings are appropriate for the prevailing conditions. At this point the photographer may feel confident to take a series of exposures without having the subsequent exposures developed and mounted in the camera.

On the other hand, if the photographer concludes that the light and camera settings are not appropriate, the photographer can make changes and continue to have exposures developed in the camera until such time as he (or she) is satisfied with the results. Then, the photographer can make subsequent exposures without developing the film in the camera.

These and other objects and advantages of the present invention will become apparent from a reading of the following specification, taken in conjunction with the enclosed drawings.

BRIEF DESCRIPTION OF THE DRAWINGS

FIG. 4 is a top view of one embodiment of the film assembly used in the camera;

FIG. 5 is a top plan view of an unassembled top portion of a slide mounting used in the camera;

FIG. 6 is a cross sectional view of the top portion of the slide mounting shown in FIG. 5 taken along the line 6—6;

FIG. 7 is a top view of an unassembled bottom portion of a slide mounting that fits together with the top portion shown in FIG. 5 to form the assembled slide mounting shown in FIG. 10;

FIG. 8 is a cross sectional view of the bottom portion of the slide mounting shown in FIG. 7 taken along line 8—8;

FIG. 9 is an enlarged cross sectional view of the top and bottom portions, respectively, of the open slide mounting with an exposed film chip, and further showing a processing pod and a pair of processing rollers juxtaposed thereto.

FIG. 10 is a cross sectional view of the assembled slide mounting, corresponding substantially to FIG. 9, but showing the slide mounting passed through the processing rollers to rupture the pod.

DESCRIPTION OF THE PREFERRED EMBODIMENT

Figure 1:
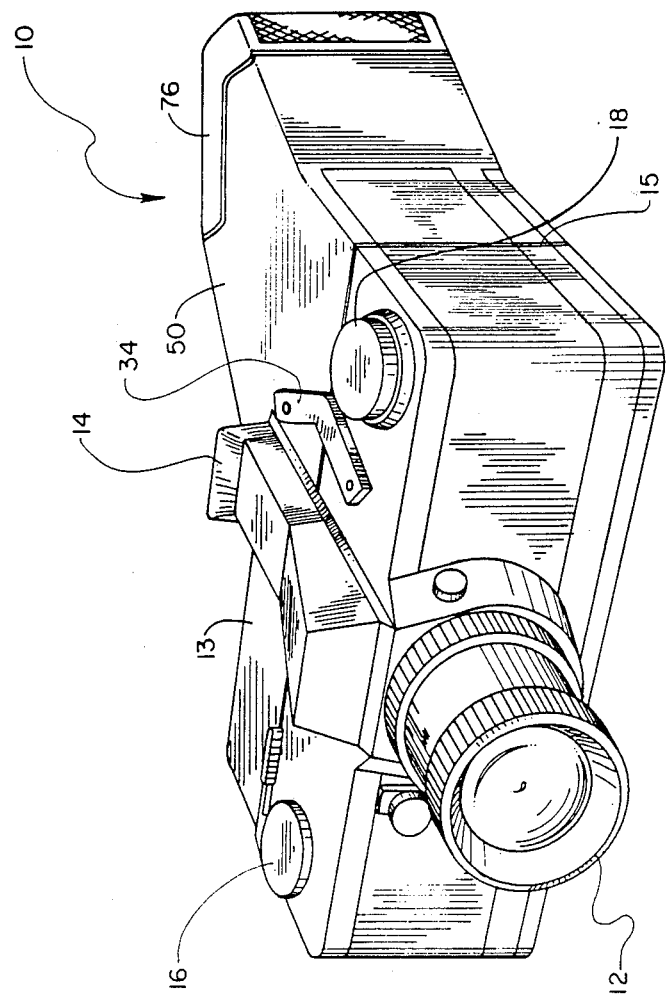
FIG. 1 is a perspective view looking down upon the front of a camera.
Figure 2:
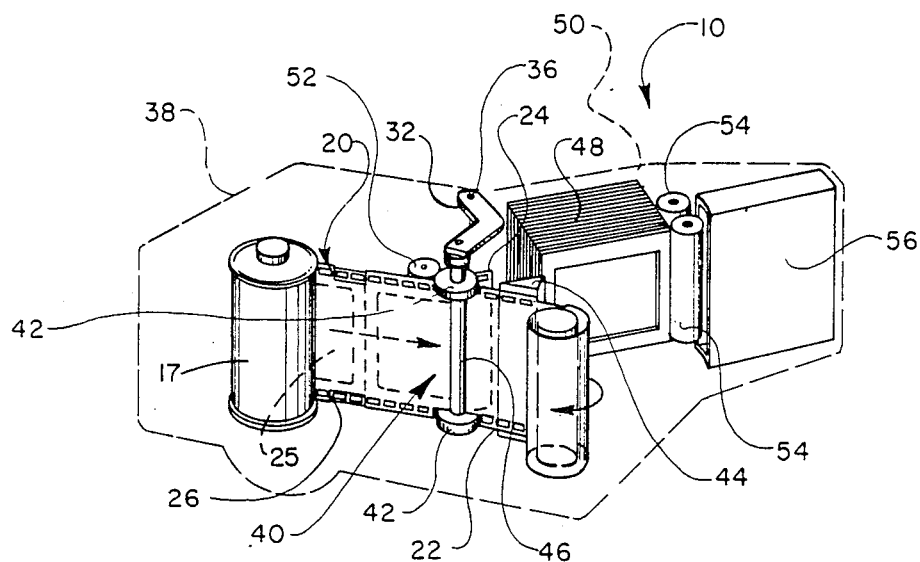
FIG. 2 is a perspective view of the embodiment of the camera shown in FIG. 1 with the camera being shown in phantom lines.

With reference to the drawings, and more particularly to FIGS. 1 and 2, there is disclosed a preferred embodiment of the photographic apparatus of the present invention. The preferred embodiment is a camera 10 having the usual lens 12, a film loading door 13 pivotable about a hinge 15, viewfinder 14, film storage chamber 16 for housing a film cassette 17 of the 35 MM type, and a shutter button 18. The film used in the preferred embodiment is a film assembly 20 which includes a transparent carrier strip 22 and a plurality of film chips 24 of the instant transparency type having image bearing areas 25.

As shown in greater detail in FIG. 4, the carrier strip 22 has a plurality of redirection cutouts 26 where a piece of the carrier strip 22 has been removed. The film chips 24 are retained on the carrier strip by use of a tacky adhesive applied to the edges 28 of the carrier strip. The film chips 24 are positioned on the carrier strip 22 so that they overlap with the redirection cutouts 26. The film assembly 20 also has a plurality of sprocket apertures 30 which engage a sprocket gear (not shown) in the camera for advancing the film.

Figure 3:
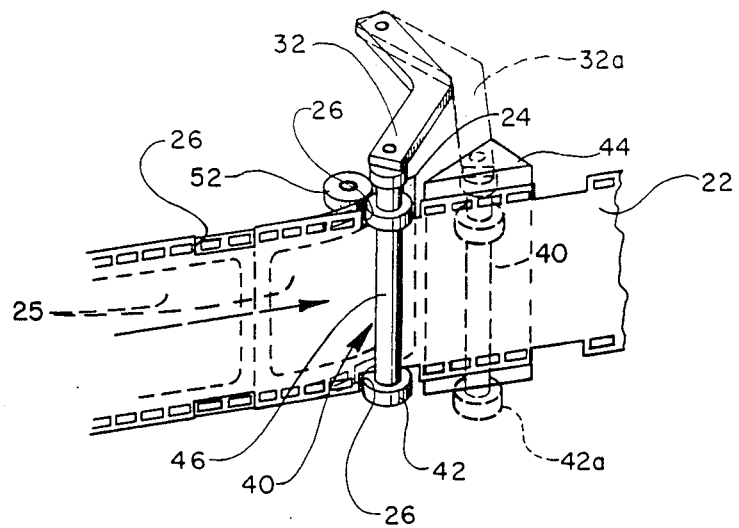
FIG. 3 is a close up view of the chip lifting roller shown in FIG. 2 and in addition shows the roller in broken lines when not in contact with the carrier strip.

In FIGS. 2 and 3, a pair of lever arms 32 (only one shown) are pivoted about a pin 36 and are rotatable about the pin 36 by an actuator 34 located on the exterior of the camera 10. Pin 36 is fixed to the housing 38 of the camera. The other end of the lever arms 32 are connected to a directing roller assembly which, in the preferred embodiment, is a chip lifting roller assembly 40. The chip lifting roller assembly 40 includes a pair of chip lifting rollers 42 integrally formed on opposite ends of a shaft 46. The lever arm 32 and the chip lifting roller assembly 40 are shown in a first selected position. In the first selected position, the outer portions of chip lifting rollers 42 either press up against the back surface of the carrier strip 22 when the rollers 42 are not in registration with the redirection cutouts 26, or the rollers 42 extend into and through redirection cutouts 26 in the carrier strip 22 when the rollers 42 are in registration with the cutouts 26.

Since the film chips 24 overlap with the redirection cutouts 26, they are contacted by the chip lifting rollers 42 when the rollers extend through the redirection cutouts. By contacting the film chips 24, the lifting rollers 42 exert a separating force upon the film chip 24 with which the rollers 42 are in contact. The separating force exerted by the lifting rollers 42 overcomes the adhesive force due to the tacky adhesive at the edges 28 of the carrier strip 22 (as shown in FIG. 4) and the film chip 24 begins to separate from the carrier strip 22. When the chip lifting rollers 42 separate the film chip from the carrier strip, they also press the leading edge of the lifted film chip onto a complementary set of lifted chip guide rollers 52 (only one being shown). In this way leading edge of a lifted film chip is guided away from the carrier strip as it is pinched between the lifting rollers 42 and the guide rollers 52. Complete separation of the film chip 24 from the carrier strip 22 is aided by a wedge 44 as the carrier strip 22 is advanced by the sprocket drive (not shown) in the direction shown by the arrows on the carrier strip 22 and the film chip 24 is guided away from the carrier strip 22.

After the film chip 24 is stripped off the carrier strip 22, the chip 24 is guided into the open end of a slide mounting 48 which is stored in a section 50 of the camera 10.

In FIG. 3, the lever arm 32 and the chip lifting roller assembly 40 are shown in a second selectable position, that is, when the lifting rollers 42 are not in contact with the carrier strip 22. In this position, the lever arm and the chip lifting rollers are shown in dotted outline as lever arm 32a and lifting rollers 42a.

As shown in FIGS. 5–10, each slide mounting 48 includes a frame-like film chip support assembly 57 which has a top portion 58 and a bottom portion 60 defining a region for receiving the exposed film chip 24 therebetween. Each slide mounting 48 also includes a rupturable pod 62 (see FIGS. 9 and 10) for containing film developing materials and a strip sheet 64 supported by the frame-like film chip support assembly that serves to assist in the spreading of the film developing materials when the pod is ruptured.

Once the film chip 24 is in the slide mounting 48, an advancing mechanism (not shown) will grab the mount that has the film chip in it and move it between a pair of processing rollers 54. The processing rollers 54 are driven and advance the slide mounting 48 with the film chip in it into a dark chamber or imbibition chamber 56, as shown in FIG. 2. In the imbibition chamber 56, the developing or processing materials permeate the layers of the film chip and bring about the formation of a visible image in the film chip.

The slide mounting 48 can have an integral hinge 66 for keeping the top and bottom parts of the frame-like film chip support connected together, both when the slide mounting is open to receive the film chip and when the slide mounting is closed after the film chip has been processed. When the slide mounting 48 has been closed by the processing rollers 54, it can be kept closed by any suitable means such as by heat sealing means or mechanical connectors. Mechanical means such as a male-female connection or a tongue and groove can be used to keep the slide mounting shut.

In the slide mounting 48, the frame-like film chip support assembly 57 includes a recess 68 (see FIG. 5) for receiving a tab 70 of the strip sheet 64 whereby the tab 70 is grasped to remove the strip sheet and the negative layer from the developed film chip to leave a developed transparency in the film chip support assembly 57.

Preferably, the frame-like film chip support assembly has bevelled edges 72 for guiding a film chip into the slide mounting 48. Also, each of the bevelled edges 72 includes a pair of laterally spaced slots 74 which are designed to allow a film chip advancing member (not shown) to fully insert the film chip 24 into the slide mounting 48. The film chip support assembly 57 can be made of conventional slide mounting materials such as plastic and cardboard.

After the film chip 24 has been processed to the extent that it may be subjected to the ambient light, a door 76 of the camera 10 may be opened and the processed and fully mounted film chip 24 removed from the dark chamber 56. The tab 70 may then be grasped and pulled in a direction which removes the strip sheet 64 (along with the film chip's emulsion layer) from the remainder of the film chip.

The teachings of the present invention can be used with a conventional camera as a camera back attachment. The back of a conventional camera can be unscrewed from the camera, and an attachment apparatus made in accordance with the invention can be attached to the camera as a camera back. When the features of the invention such as slide mounting and/or development of the film inside the camera are no longer desired, then the attachment of the invention can be removed and the original back of the camera reinstalled.

The selectable directing means of the invention can be used with film cartridges as well as with film chips on a continuous carrier strip. With film cartridges, an exposed cartridge can be selectively directed to a slide mounting and/or developing chamber. Otherwise, an exposed cartridge can be selectively directed to a retention area until further processing at another location can be had.

As an alternative to using a cutout on the carrier strip for aiding the positioning of the film chip with respect to the chip lifting rollers, a chip locator can be employed that permits proper positioning of the film chip near the chip lifting roller. The chip locator can be either optical or mechanical. An optical chip locator can be transmissive or reflective and can operate with infrared or visible light. A mechanical chip locator can sense the presence or absence of an elevation or depression in an individual film chip, or it can sense a portion of the carrier strip underlying the chip. One suitable chip locator is a hole extending through both an individual film chip and the portion of the carrier underlying the chip.

Thus far employing the principles of the invention have been described in the context of a camera having the option of on board processing and/or slide mounting or the simple retention of exposed film chips on a film take-up roller in the camera for future rewinding into its original film cassette for subsequent processing either within the camera or exteriorly thereof. In an alternative embodiment of the invention, the apparatus of the invention can be used in the editing of a previously exposed film roll. For example, a previously exposed film roll can be placed in the apparatus of the invention, and the previously exposed film chips can optionally be mounted as a slide and/or developed in the apparatus or, alternatively, be retained on a take-up spool for still later development or further editing.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A photographic apparatus for a self-developing or instant type medium for recording an image upon exposure to light, said apparatus comprising:

means for developing an exposed image recording medium in said photographic apparatus;

means for retaining an exposed and undeveloped image recording medium in said photographic apparatus; and selectable directing means for selectively directing a recorded image medium exposure to said developing means for immediate processing of its latent image or to said retention means for subsequent processing exteriorly of said apparatus.

2. A photographic apparatus for a self-developing or instant type medium for recording an image upon exposure to light, said apparatus comprising:

means for mounting an exposed image recording medium in a slide mounting in said photographic apparatus;

means for retaining an exposed and unmounted image recording medium in said photographic apparatus; and selectable directing means for selectively directing a recorded image medium exposure to said slide mounting means or to said retention means.

3. A photographic apparatus for a self-developing or instant type medium for recording an image upon exposure to light, said apparatus comprising:

means for mounting an exposed image recording medium in a slide mounting in said photographic apparatus, wherein said mounting means includes means for developing the exposed image recording medium in said photographic apparatus;

means for retaining an exposed and unmounted image recording medium in said photographic apparatus; and selectable directing means for selectively directing a recorded image medium exposure to said slide mounting means or to said retention means.

4. The camera described in claim 1 wherein said selectable directing means is comprised of a roller which is manually positioned to direct the exposed image recording medium.

5. The camera described in claim 1 wherein said image recording medium is comprised of a film assembly which includes a continuous carrier strip and a plurality of separable film chips attached to the carrier strip.

6. The camera described in claim 5 wherein the film chips are detachably connected to said carrier strip such that the film chips may be individually separated from said carrier when a relatively small separating force is exerted on the chip by said selectable directing means.

7. The camera described in claim 5 wherein said carrier strip has a plurality of redirection cutouts at intervals along said carrier strip, said redirection cutouts coinciding with the leading edges of said film chips.

8. A camera containing self-developing or instant type film chip for recording an image upon exposure to light, said camera comprising:

slide mounting means for mounting the exposed film chip in said camera;

means for retaining exposed and unmounted film chips in said camera; and selectable directing means for selectively directing an exposed film chip to said exposed film slide mounting means or to said exposed film retention means;

said selectable directing means comprising a roller which is manually positioned to selectively direct the exposed film chip to either said slide mounting means or to said retention means.

9. The camera described in claim 8 wherein said slide mounting means includes means for locating a frame-like film chip support means defining a region for receiving an exposed film chip in the path of travel of the exposed film chip.

10. A camera containing self-developing or instant type film for recording an image upon exposure to light, said camera comprising:

means for mounting the exposed film in a slide mounting in said camera wherein said mounting means includes means for developing the exposed film in said camera;

means for retaining exposed and unmounted film in said camera; and selectable directing means for selectively directing a film exposure to said exposed film slide mounting means or to said exposed film retention means.

11. The camera described in claim 10 wherein said means for mounting the exposed film in the camera include a pair of rollers.

12. The camera described in claim 10, further including an imbibition chamber for retaining said film after its mounting and during its development.

13. A camera for recording an image upon a film chip of the self-developing type upon exposure to light, said camera comprising:

means for supporting a film assembly in position for exposure, the film assembly includes a continuous carrier strip and a plurality of separable film chips attached to the carrier strip at intervals along said carrier strip, the carrier strip having a plurality of redirection cutouts at intervals along the carrier strip, the redirection cutouts coinciding with the leading edges of the film chips;

means for mounting the exposed film chips in slide mountings in said camera wherein said mounting means includes means for developing the exposed film in said camera and means for locating a plurality of the slide mountings in the path of movement of the film chips;

spool means for retaining exposed and unmounted film chips in said camera; and selectable directing means for selectively directing an exposed film chip to said exposed film slide mounting means or to said exposed film retention means, said selectable directing means including roller means which enter the cutouts on the carrier strip and contact the leading edge of a film chip thereby causing the film chip to begin to separate from the carrier strip.

14. The camera described in claim 13, further comprising wedge means for completing the separation of a film chip from the carrier strip.

15. A camera for recording an image upon a film chip of the self-developing or instant type upon exposure to light, said camera comprising:

means for supporting a film assembly in position for exposure, the film assembly including a continuous carrier strip on a storage spool and a plurality of separable film chips attached to the carrier strip at intervals along said carrier strip, the carrier strip having a plurality of redirection cutouts at intervals along the carrier strip, the redirection cutouts coinciding with the leading edges of the film chips;

means for mounting the exposed film chips in individual slide mountings in said camera, said mounting means including means for developing the exposed film chip in said camera, said mounting means including a pair of rollers for spreading a processing liquid across a layer of the exposed film chip while simultaneously completing the mounting of the film chip in the slide mounting;

means defining a lighttight chamber for storing said film chips subsequent to their mounting;

spool means for retaining exposed and unmounted film in said camera; and selectable directing means for selectively directing an exposed film chip to said exposed film chip mounting means or to said exposed film chip retention means, said selectable directing means including roller means which enter the redirection cutouts on the carrier strip and contact the leading edge of a film chip thereby causing the film chip to begin to separate from the carrier strip.

16. The camera described in claim 15, further comprising wedge means for completing the separation of a film chip from the carrier strip.

* * * * *